(12) United States Patent
Pepitone

(10) Patent No.: US 7,444,212 B2
(45) Date of Patent: Oct. 28, 2008

(54) JET EXHAUST DISPLAY

(75) Inventor: David Pepitone, Cave Creek, AZ (US)

(73) Assignee: Honeywell International Inc., Morristown, NJ (US)

( * ) Notice: Subject to any disclaimer, the term of this patent is extended or adjusted under 35 U.S.C. 154(b) by 82 days.

(21) Appl. No.: 11/386,181

(22) Filed: Mar. 22, 2006

(65) Prior Publication Data

US 2007/0225874 A1    Sep. 27, 2007

(51) Int. Cl.
G08B 21/00   (2006.01)

(52) U.S. Cl. .......................................... 701/3; 340/945

(58) Field of Classification Search ................. 701/300, 701/3; 715/705; 340/945
See application file for complete search history.

(56) References Cited

U.S. PATENT DOCUMENTS

| | | | |
|---|---|---|---|
| 4,919,536 A * | 4/1990 | Komine | 356/28.5 |
| 5,127,609 A * | 7/1992 | Lynn | 244/114 B |
| 2005/0229586 A1 * | 10/2005 | Whurr | 60/226.1 |
| 2006/0191326 A1 * | 8/2006 | Smith et al. | 73/73 |
| 2006/0256318 A1 * | 11/2006 | Curtin | 356/28 |

* cited by examiner

*Primary Examiner*—Mark Hellner
(74) *Attorney, Agent, or Firm*—Ingrassia, Fisher & Lorenz, P.C.

(57) ABSTRACT

A graphics display system is provided. The graphics display system comprises a display element, a database adapted to store thrust profile data, and at least one processing unit coupled to the display element and the database. The at least one processing unit is adapted to process thrust profile data from the database and to transmit control signals to the display element to display at least one spatial representation of thrust profile data associated with an aircraft.

20 Claims, 5 Drawing Sheets

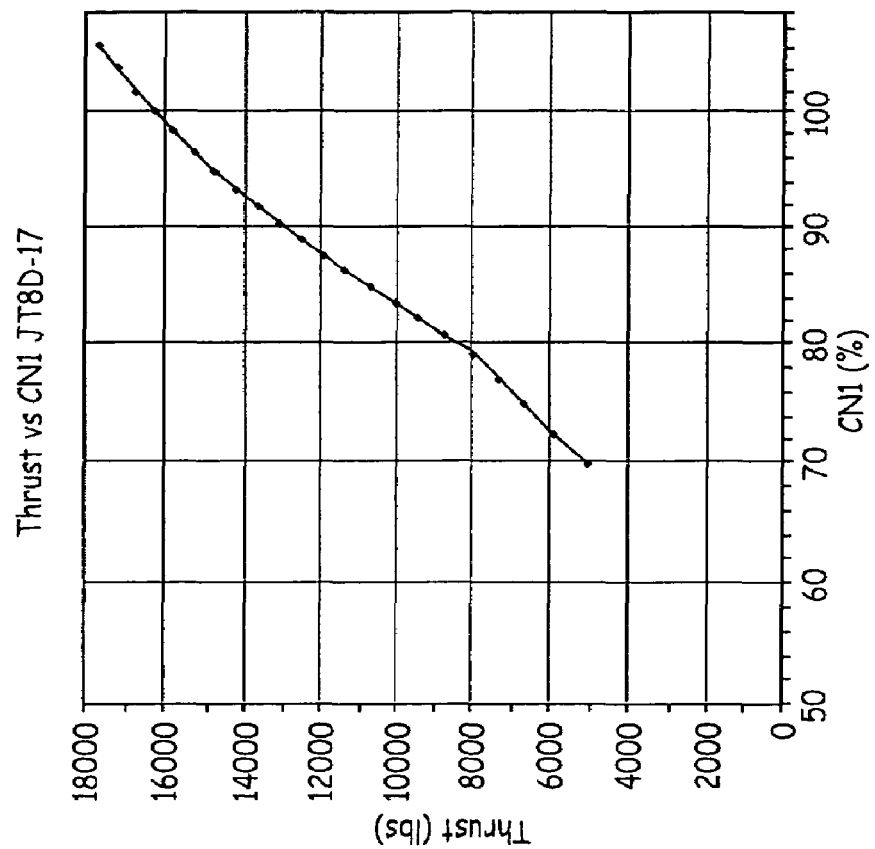
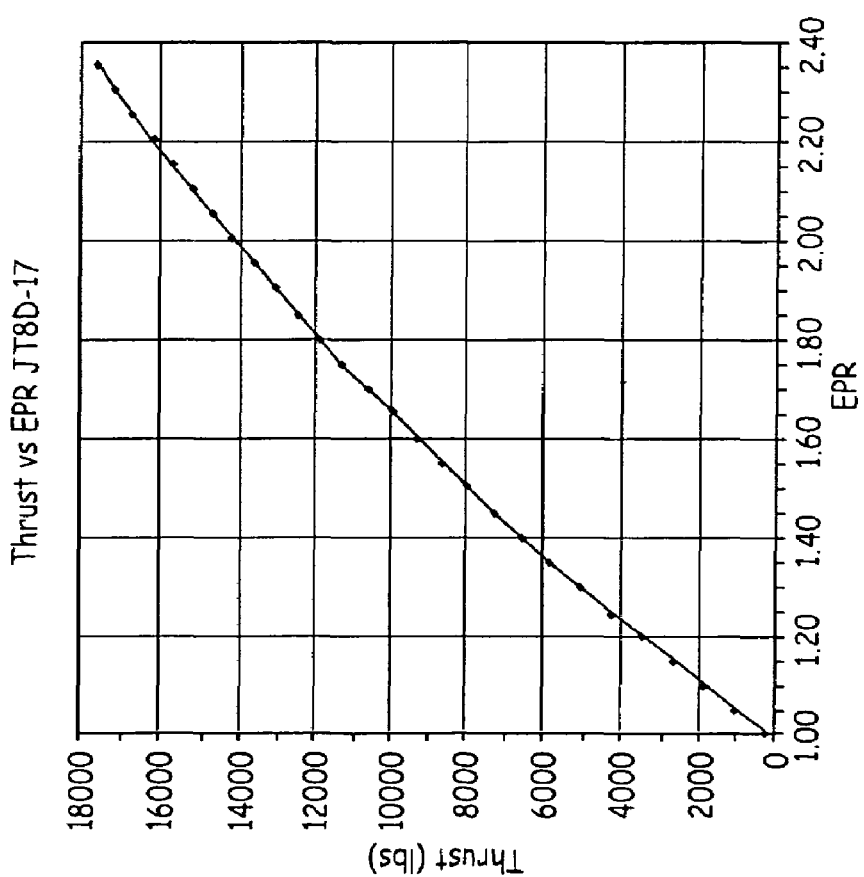
FIG. 5

JET EXHAUST DISPLAY

BACKGROUND

Airport ramp safety has, until recently, been a hidden safety problem. Airport ramp safety includes the presence of unprotected jet engine blast that has thrown baggage carts through terminal windows, blown trucks over, sucked people through jet intakes, torn roofs off of nearby homes, blown other large aircraft off taxiways, and in many cases wrecked aircraft controls causing several inflight crashes, killing all aboard. Jet blast winds greatly exceed Hurricane Force 5 winds hundreds of feet behind the jet engine(s). The velocity of the jet blast directly behind the aircraft can exceed 350 MPH. It is so serious that the National Transportation Safety Board (NTSB) has rated it number 3 on its 'Most Wanted' safety list. The Flight Safety Foundation has ranked it in the top 10.

Airlines are suffering a 3 billion dollar plus repair bill annually with indirect costs reaching 3 times that amount. Yet little has been done to mitigate this problem other than installing jet blast fences in the engine run-up areas or the departure ends of runways. The taxiway and ramp areas are largely unprotected from jet engine blast. Other than providing training, better operating procedures and general awareness, there is not any technical response to the problem.

Therefore, for the reasons stated above, and for other reasons stated below which will become apparent to those skilled in the art upon reading and understanding the present specification, there is a need in the art for a system to alleviate the problems of jet engine blast.

SUMMARY

The above-mentioned problems and other problems are resolved by the present invention and will be understood by reading and studying the following specification.

In one embodiment, a graphics display system is provided. The graphics display system comprises a display element, a database adapted to store thrust profile data, and at least one processing unit coupled to the display element and the database. The at least one processing unit is adapted to process thrust profile data from the database and to transmit control signals to the display element to display at least one spatial representation of thrust profile data associated with an aircraft.

In another embodiment, a method of displaying thrust profile data is provided. The method comprises receiving location data from at least one sensor for aircraft within a set geographical area, retrieving thrust profile data from a database for at least one aircraft within the set geographical area, and displaying a spatial representation of the thrust profile data in relation to the at least one aircraft's location.

In another embodiment, a computer program comprising a computer-usable medium having computer-readable code embodied therein for configuring a computer processor is provided. The computer-readable code comprises first executable instructions configured to cause a computer processor to retrieve thrust profile data from a database for at least one aircraft, and second executable instructions configured to cause a computer processor to transmit control signals to display element to display on a map a spatial representation of the at least one aircraft's thrust profile data

DRAWINGS

FIG. 5 is exemplary charts of original equipment manufacturer provided data correlating engine parameters with engine thrust.

DETAILED DESCRIPTION

Figure 1:
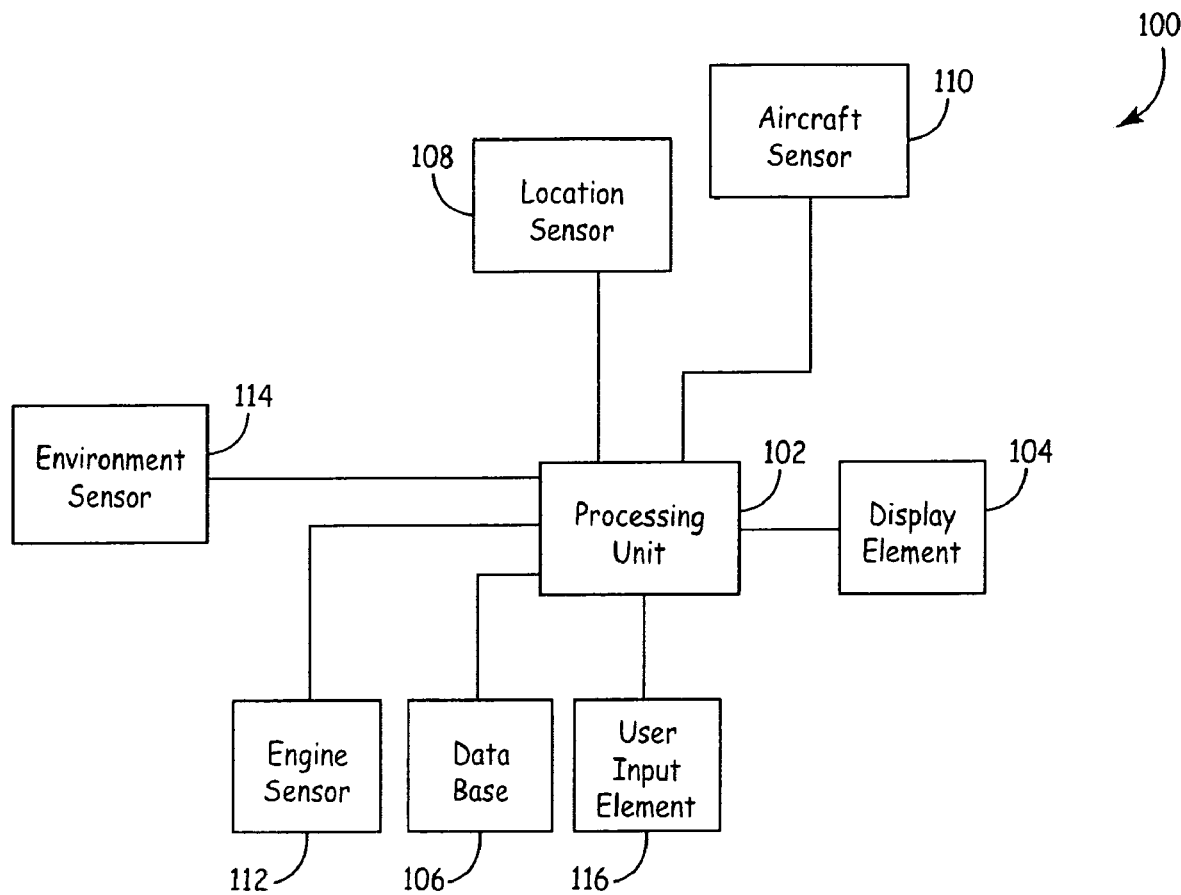
FIG. 1 is a simplified block diagram of a graphics display system according to one embodiment of the present invention.

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. It should be understood that the exemplary method illustrated may include additional or fewer steps or may be performed in the context of a larger processing scheme. Furthermore, the method presented in the drawing figures or the specification is not to be construed as limiting the order in which the individual steps may be performed. The following detailed description is, therefore, not to be taken in a limiting sense.

Embodiments of the present invention may be described in terms of functional block diagrams and various processing steps. It should be appreciated that such functional blocks may be realized in many different forms of hardware, firmware, and or software components configured to perform the various functions. For example, embodiments of the present invention may employ various integrated circuit components, e.g., memory elements, digital signal processing elements, look-up tables, and the like, which may carry out a variety of functions under the control of one or more microprocessors or other control devices. Such general techniques are known to those skilled in the art and are not described in detail herein. Moreover, it should be understood that the exemplary process illustrated may include additional or fewer steps or may be performed in the context of a larger processing scheme. Furthermore, the various methods presented in the drawing figures or the specification are not to be construed as limiting the order in which the individual processing steps may be performed.

Embodiments of the present invention give flight crews, ground crews, and air traffic controllers a direct visualization of the jet blast profile so that risk can be managed. By providing a dynamic display of jet blast profiles, individuals, e.g. pilots in command of the aircraft, are better able to avoid causing and being victim to jet blast accidents.

FIG. 1 is a simplified block diagram of a graphics display system 100 according to one embodiment of the present invention. In FIG. 1, an exemplary graphical display system 100 includes processing unit 102 configured to transmit control signals to display element 104. Display element 104 includes any display element suitable for displaying the various symbols and information for the operation of embodiments of the present invention. There are many known monitors that are suitable for this task, such as various CRT and flat-panel display systems. Display element 104 is instantiated on a panel mounted display, a heads-up display (HUD) projection, or any other existing or later developed display technology.

In addition, one or more data sources are coupled to processing unit 102. These data sources include, but are not limited to, thrust profile database 106, location sensor 108, aircraft sensor 110, engine sensor 112, environment sensor 114, and user input element 116. In some embodiments, one or more of these data sources is omitted.

Database 106 is adapted to store thrust profile data for at least one aircraft type. In this example, the thrust profile data is stored as tabular data, though the present invention is not intended to be so limited. Thrust profile data in database 106 is stored on any type of suitable medium such as floppy disks, conventional hard disks, CD-ROM, flash ROM, nonvolatile ROM, or other suitable medium. The thrust profile data is divided, in some embodiments, into break-away thrust profile data, idle thrust profile data, and take-off thrust profile data for each aircraft type. A break-away thrust profile refers to the pattern of jet exhaust velocities as an aircraft begins to move from a stop to a taxi speed. An idle thrust profile refers to the pattern of jet exhaust velocities for an aircraft that is taxiing at an airport or not moving. A take-off thrust profile refers to the pattern of jet exhaust velocities for an aircraft that is accelerating on a runway to speeds necessary to take-off.

Database 106 is typically located onboard an aircraft with display system 100. However, it is not required that database 106 be so located. For example, in some embodiments, database 106 is located in an air traffic control tower. In addition, although, display system 100 is instantiated onboard an aircraft in this exemplary embodiment, it is to be understood that in other embodiments, display system 100 is instantiated in other locations. For example, in some embodiments, display system 100 is instantiated on a display in an air traffic control tower and on a display in ground crew equipment at an airport.

Processing unit 102 includes or interfaces with hardware components and circuitry that support the display of spatial representations of thrust profile data. By way of example and not by way of limitation, these hardware components include one or more microprocessors, memories, storage devices, interface cards, and other standard components known in the art. Additionally, processing unit 102 includes or functions with software programs, firmware or computer readable instructions for carrying out various methods, process tasks, calculations, and control functions, used in the displaying spatial representations of thrust profile data. The computer readable instructions, firmware and software programs are tangibly embodied on any appropriate medium used for storage of computer readable instructions including, but not limited to, all forms of non-volatile memory, including, by way of example and not by limitation, semiconductor memory devices, such as EPROM, EEPROM, and flash memory devices; magnetic disks such as internal hard disks and removable disks; magneto-optical disks; and DVD disks.

Figure 4:
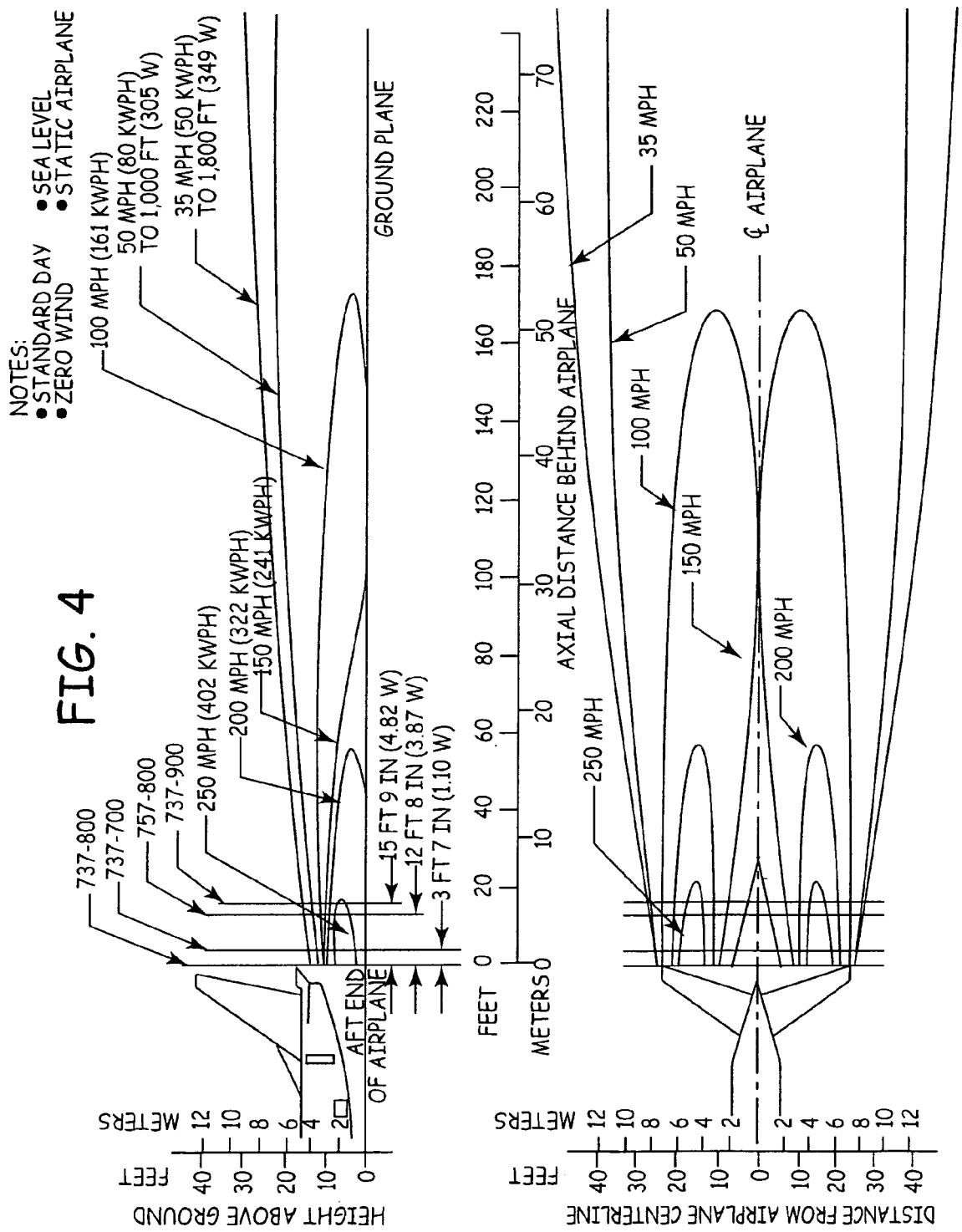
FIG. 4 is an exemplary graph of original equipment manufacturer provided thrust profile data.

Processing unit 102 retrieves thrust profile data from database 106 and transmits control signals to display element 104 to display at least one aircraft and a spatial representation of the thrust profile data for the aircraft retrieved from database 106. A spatial representation of the thrust profile data is a representation of the location of jet exhaust velocities in real space in relation to the aircraft and other objects. The display shape and size of the spatial representations is obtained in this example embodiment from thrust profile data in the form of graphs and tables provided by original equipment manufactures (OEM) of the aircraft, such as exemplary thrust profile contours in FIG. 4. The data is extracted from the OEM graphs and tables and stored in database 106 as tabular data in this example embodiment. Processing unit 102 uses a linear interpolation algorithm, in this example embodiment, to extrapolate data between data points in the graphs and tables provided the OEMs. However, it is to be understood that in other embodiments non-linear interpolation algorithms are used.

For this example, processing unit 102 is also adapted to transmit control signals to display element 104 to display thrust profile data using warning, caution and advisory zones based on jet exhaust velocities. For example, in one exemplary embodiment, processing unit 102 transmits a control signal to display element 104 to display a warning zone for locations where exhaust velocities are greater than 100 knots, a caution zone for locations where exhaust velocities are between 50 and 100 knots, and an advisory zone for locations where exhaust velocities are less than 50 knots. The data indicating exhaust velocities is obtained from OEM provided graphs and tables. Processing unit 102 is adapted to use a linear interpolation algorithm in this embodiment, to extrapolate exhaust velocity data points between data points on the OEM graphs and tables. Processing unit 102 then transmits the patterns to display element 104 for display.

The different zones are distinguished by using different colors. For example, in one embodiment, warning zones are red, caution zones are yellow, and advisory zones are green. However, it will be understood by one of skill in the art that other colors and exhaust velocities are used in other embodiments. For example, in one alternative embodiment, the thrust profile data is displayed using just one zone to represent the location of jet exhaust velocities regardless of the value of the exhaust velocities. In other embodiments, processing unit 102 is adapted to determine where to display different zones based on temperature boundary points.

For this example embodiment, aircraft sensor 110 detects the location of aircraft within a set geographical area. In addition, aircraft sensor 110 also obtains identifying data for each aircraft such as engine type and aircraft model. In this example, aircraft sensor 110 is implemented as a receiver adapted to receive automatic dependent surveillance-broadcast (ADS-B) signals from the aircraft. This signal identifies the aircraft type and location. Aircraft sensor 110 also includes one of, in other embodiments, a global positioning system (GPS) receiver, radio detection and ranging (RADAR) systems, and other like position sensors to obtain the location of each aircraft. Aircraft sensor 110 passes this information to processing unit 102. Processing unit 102 retrieves thrust profile data for each aircraft based on the data received. For example, processing unit 102 retrieves specific thrust profile data for each type of aircraft in the area. Alternatively, in other embodiments, processing unit 102 retrieves generic thrust profile data for each aircraft. In such situations, a general awareness of the thrust profile for each aircraft is available even if identifying information is not available for a particular aircraft.

Also, for this example embodiment, processing unit 102 is adapted to transmit signals to display element 104 to adjust the thrust profile of each aircraft based on the movement of the aircraft. For example, processing unit 102 transmits control signals to display element 104 to display a break-away thrust profile for aircraft that has just begun to move on a taxiway and has speeds below 15 knots. Similarly, processing unit 102, in this example, transmits control signals to display element 104 to display an idle thrust profile for aircraft with taxi speeds above 15 knots, and a takeoff thrust profile for aircraft that has just begun to move on a departing runway.

Location sensor 108 is used in this example embodiment to obtain ownship location data. When referring to embodiments in which the display system 100 is not located onboard an aircraft, ownship location refers to the location of the display system 100. Location sensor 108 passes location data to processing unit 102. Processing unit 102 processes the location data and transmits controls signals to display element 104 to display the thrust profile data for ownship on a map indicating the location of ownship. Location sensor 108 is implemented as a global positioning system receiver, dead reckoning system, and other similar location sensors.

Engine sensor 112 is used in this example embodiment to determine an engine parameter related to the thrust of ownship. The engine parameter includes, but is not limited to, throttle angle, fuel flow, engine pressure ration (EPR) and jet fan speed (e.g. CN1). Engine sensor 112 passes the data to processing unit 102. Processing unit 102 calculates ownship thrust based on the engine parameter using OEM provided graphs and tables correlating engine parameters with engine thrust, such as exemplary graphs in FIG. 5. Processing unit 102 then correlates the calculated thrust to thrust profile data in database 106. In one embodiment, processing unit 102 rounds up to the nearest thrust level entry in database 106 when the calculated thrust does not match a thrust level entry in database 106. In other embodiments, other means are used for correlating the calculated thrust to the thrust profile data in database 106. Based on the thrust profile data received from database 106, processing unit 102 transmits control signals to display element 104 to display a spatial representation of the thrust profile data. As the engine parameter changes, processing unit 102 continues to correlate calculated ownship thrust to thrust profile data in database 106 and transmit control signals to display element 104 to dynamically adjust the displayed spatial representation of thrust profile data.

For this example embodiment, system 100 also includes environment sensor 114. Environment sensor is adapted to obtain information about the environment which may affect the thrust profile of aircraft. For example, in this example, environment sensor 114 is adapted to obtain data regarding wind speed and direction. A crosswind, headwind, and tailwind can each displace the direction of jet exhaust to varying degrees based on the velocity of the jet exhaust and the speed and direction of the wind. For example, a 35 mile per hour crosswind can displace a 45 mile per hour exhaust zone of an idle thrust profile approximately 175 feet to one side. Processing unit 102 receives the environment information from sensor 114 and calculates the effect that any detected wind has on the thrust profile. Processing unit 102 calculates the effect of wind based on available data from research done by the Federal Aviation Administration (FAA) modeling the effects of wind on wake turbulence. In this embodiment, processing unit 102 uses the FAA research to model lateral effects. However, in other embodiments, vertical effects are also modeled based on the FAA research. Processing unit 102 then transmits control signals to display element 104 to display a modified thrust profile showing the effect of wind.

The exemplary system 100 in FIG. 1 also includes user input element 116. User input element 116 includes, but is not limited to, keyboards, touch screens, microphones, cursor control devices, line select buttons, etc. In some embodiments, user input element 116 comprises more than one type of input element. In other embodiments, display system 100 does not include user input element 116. User input element 116 is used to provide user feedback to display system 100. For example, in this example, user input element 116 is used to select aircraft displayed on display element 104 for which a thrust profile should be displayed. User input element 116 also enables a user to stop the display of thrust profile for selected aircraft. In addition, user input element 116 enables a user to zoom in and out of the display on display element 104.

Figure 2:
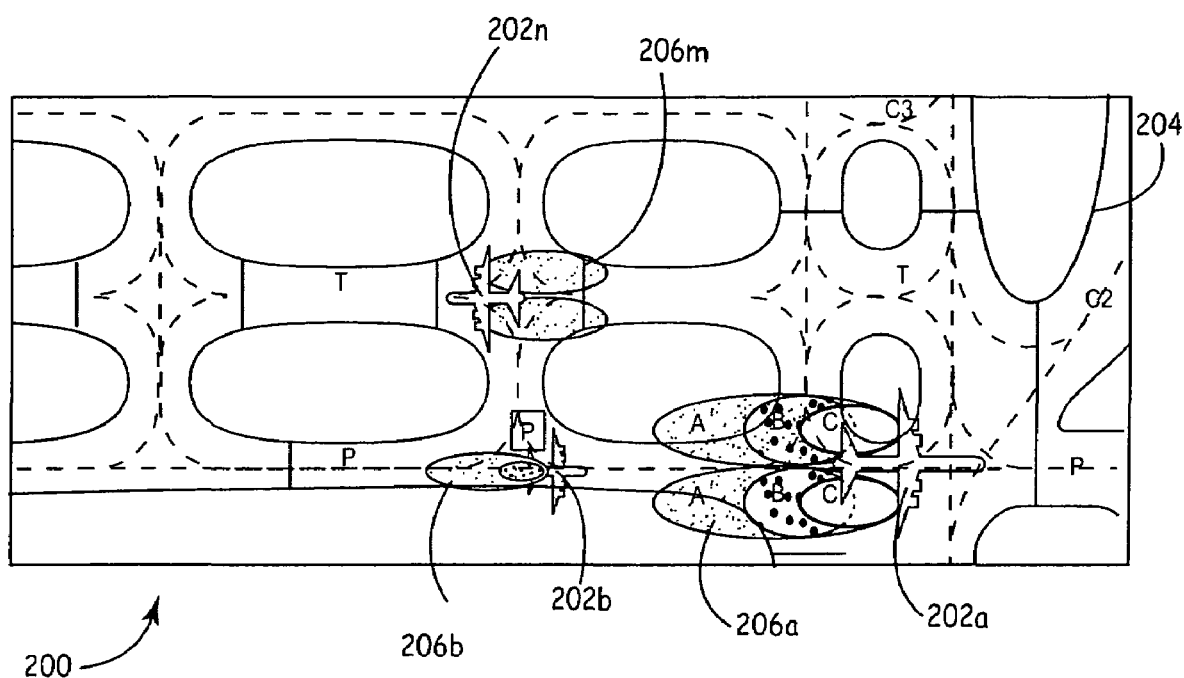
FIG. 2 is a representation of a jet exhaust display according to one embodiment of the present invention.

FIG. 2 is an image of a jet exhaust display 200 according to one embodiment of the present invention. Jet exhaust display 200 is an exemplary display produced by a graphics display system, such as system 100 in FIG. 1. As can be seen in FIG. 2, a display element, such as display element 104, displays each of aircraft 202*a*-202*n* on map 204 with a corresponding thrust profile 206*a*-206*m*, where n is the total number of aircraft and m is the total number of thrust profiles displayed. Although each aircraft 202*a*-202*n* is displayed with a corresponding thrust profile 206*a*-206*m*, it is to be understood that, in other embodiments, not every aircraft is displayed with a thrust profile. Thrust profiles 206*a*-206*m* are spatial representation of thrust profile data in that they represent the physical space where jet exhaust velocities are felt in real space. Map 204 as shown in the example in FIG. 2, is a map of an airport taxiway and runways.

Each of thrust profiles 206*a*-206*m* contain at least one zone indicated by the shaded areas. For example, thrust profile 206*a* has 3 zones: A, B, and C. Each zone indicates a different range of jet exhaust velocities. For example, in profile 206*a*, zone A is an advisory zone representing a range of velocities below 50 knots, zone B is a caution zone representing a range of velocities between 50 and 100 knots, and zone C is a warning zone representing velocities above 100 knots. The above ranges of jet exhaust velocities are given by way of example and not by way of limitation. It is to be understood that, in other embodiments, other appropriate ranges are used. In addition, any appropriate number of zones can be used in thrust profiles 206*a*-206*m*. The zones in FIG. 2 are semitransparent and each zone is colored based on the range of velocities represented. For example, zone A of profile 206*a* is colored green, zone B is colored yellow, and zone C is colored red. However, it is to be understood by one of skill in the art that other colors and levels of transparency are used in other embodiments. In addition, the zone ranges are alterable, in some embodiments, with a user input element, such as user input element 116.

A processing unit, such as processing unit 102 in FIG. 1, calculates the display size and shape of profiles 206*a*-206*m* as well as the display size and shape of zones in a profile. The display size and shape of profiles 206*a*-206*m* and zones are based on thrust profile data retrieved by the processing unit from a database, such as database 106, and on other information received from sensors, such as sensors 110-116. For example, in the embodiment in FIG. 2, a receiver onboard aircraft 202*b* receives ADS-B signals from nearby aircraft. The signals provide information regarding aircraft location, movement and type.

For this example embodiment, a processing unit onboard aircraft 202*b* retrieves tabulated thrust profile data from a database for each aircraft within a specified area based on at least one of the aircraft model, engine type, and aircraft size (e.g. heavy, medium, and light). In other embodiments, a generic thrust profile is used regardless of the engine type, aircraft model, and aircraft size, etc. By only displaying thrust profiles for aircraft within a specified area rather than for all detected aircraft, processing power and memory requirements are reduced. However, in other embodiments, an area 208 is not used and all aircraft within view on display 200 are displayed with a thrust profile. In addition, a user input element can be used to select which aircraft are to be displayed with a thrust profile.

For this example embodiment, the processing unit also retrieves the thrust profile data based on the movement and location of the other aircraft. The movement and location of each aircraft places the aircraft in a category of thrust profile data for its respective aircraft type. In this example, categories are used for idle, break-away, and take-off thrust profiles. Although three categories are used in this example embodiment, it is to be understood that in other embodiments, other numbers of categories are used.

The processing unit determines the category for each aircraft based on the movement and location of the aircraft. For example, in this embodiment, the processing unit associates an aircraft that is taxiing at the airport with an idle thrust category, an aircraft that has just begun to move and has speeds below 15 knots with a break-away thrust category, and an aircraft that has just begun to move on a departure runway with a take-off thrust category. Once the processing unit determines the category in which to place each aircraft, the processing unit calculates the shape of the thrust profile to be displayed with each aircraft symbol. The processing unit transmits control signals to a display element, such as display element 104, to display the calculated thrust profiles for other aircraft as shown in FIG. 2. As the movement and location of each aircraft changes, the processing unit updates the thrust profile to reflect changes in category for each aircraft.

Additionally, in this exemplary embodiment, the processing unit calculates a thrust profile for aircraft 202*b* based on the location, engine type and an engine parameter for aircraft 202*b* where display 200 is located. The engine parameter used in this example is fuel flow. The fuel flow is used to determine the amount of thrust being produced by the aircraft engines. In other embodiments, other parameters are used such as throttle angle, engine pressure ratio, and jet fan speed. The processing unit then correlates the calculated thrust with thrust profile data from a database and transmits signals to a display element to display thrust profile 206*b* display 200 with aircraft 202*b*. As the engine parameter changes, the processing unit updates thrust profile 206*b*.

The processing unit interpolates the shape of thrust profile 206*b*, as well as thrust profiles 202*a*-202*m*, at points between zones and along the perimeter of zones, as described above. Notably, although elliptical shapes are used for zones in FIG. 2, embodiments of the present invention are not intended to be so limited. In other embodiments, other shapes are used, such as more detailed polygons to represent more detailed thrust profile patterns. In addition, although display 200 is rendered in 2 dimensions, it is to be understood by one of the skill in the art, that in other embodiments, display 200 is rendered in 3-dimensions.

Figure 3:
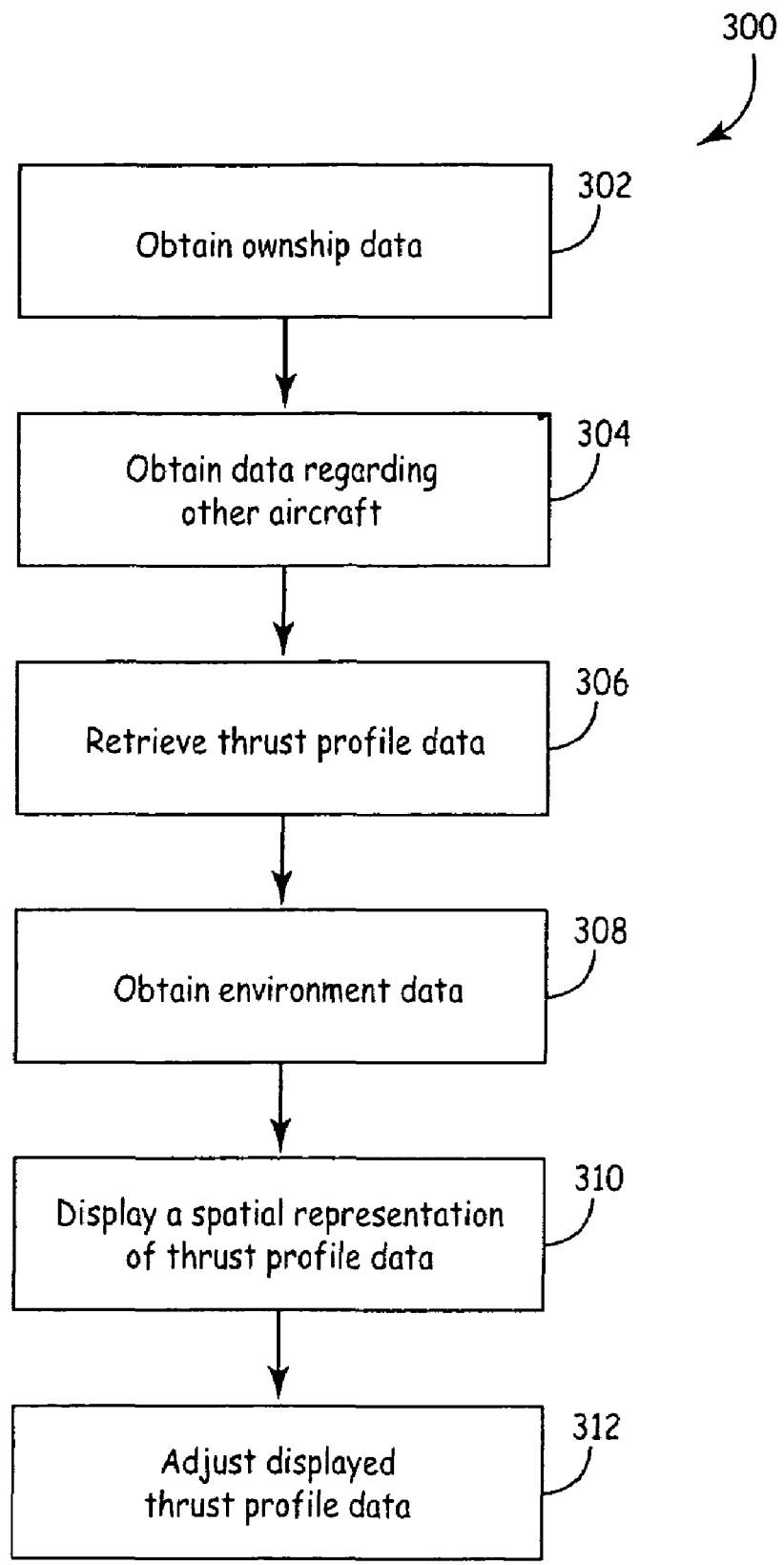
FIG. 3 is a flow chart showing a method of displaying thrust profile data according to one embodiment of the present invention.

FIG. 3 is a flow chart showing a method 300 of displaying thrust profile data according to one embodiment of the present invention. At 302, a processing unit, such as processing unit 102 in FIG. 1, aboard an aircraft obtains data regarding ownship location, movement, and engine parameter from one or more sensors, such as sensors 108 and 112. The engine parameter includes at least one of throttle angle, fuel flow, EPR, and jet fan speed. In other embodiments, the processing unit is not on board an aircraft and hence step 302 is skipped and method 300 begins at step 304. One example of such an embodiment is a display system, such as system 100, located in an air traffic control tower. At 304, the processing unit obtains data using a sensor such as sensor 110 regarding the movement, location, and type of other aircraft within a set distance from the location of the display system.

At 306, the processing unit retrieves thrust profile data for each aircraft from a database, such as database 106 in FIG. 1, based on the data obtained in steps 302 and 304. For this example embodiment, the thrust profile data is divided into three categories: idle, break-away, and take-off. In addition, the database contains thrust profile data for the three categories for various types of aircraft, such as heavy, medium, and light aircraft. However, in some embodiments, a generic thrust profile is used for each aircraft. For example, a single thrust profile (such as a profile for maximum thrust) is used for each aircraft depending on the aircraft type, but the profile data is not divided into categories. Alternatively, in such embodiments with generic thrust profiles, a generic thrust profile for each category is used for all aircraft regardless of the aircraft type, model, etc.

The processing unit uses the retrieved thrust profile data to calculate the size and shape of each thrust profile, as described above. In addition, in this example embodiment, the processing unit uses the retrieved thrust profile data to divide each thrust profile into zones based on ranges of jet exhaust velocities. In this example, the processing unit divides the thrust profiles into three zones for advisory, warning, and caution zones, as described above. However, in other embodiments, N zones are used for each thrust profile. Optionally, at 308, the processing unit receives environment data such as wind speed and direction. The processing unit uses this data to calculate the effect of wind on the location and direction of the thrust profiles, as described above.

At 310, the processing unit transmits signals to a display element, such as display element 104 in FIG. 1, to display a spatial representation of the calculated thrust profiles, such as is shown in FIG. 2. At 312, the processing unit sends signals to the display element to update the displayed thrust profiles based on updated data regarding ownship and other aircraft.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A graphics display system, comprising:
   a display element;
   a database adapted to store thrust profile data; and
   at least one processing unit coupled to the display element and the database, the at least one processing unit adapted to process thrust profile data from the database and to transmit control signals to the display element to display at least one spatial representation of thrust profile data on a map in relation to an aircraft.

2. The graphics display system of claim 1, further comprising:
   at least one sensor adapted to determine wind speed and direction; wherein the at least one processing unit is further adapted to calculate the effect of wind on the aircraft's thrust and transmit control signals to the display element to display the spatial representation of the thrust profile data modified with the effect of wind.

3. The graphical display system of claim 1, further comprising a sensor adapted to obtain at least one of location, engine type, and aircraft model of aircraft within a set geographical area; wherein the at least one processing unit is further adapted to transmit control signals to the display element to display spatial representations of thrust profile data, based on the sensor data, for each aircraft within the set geographical area.

4. The graphical display system of claim 3, wherein the sensor comprises a receiver adapted to receive automatic dependent surveillance-broadcast (ADS-B) signals.

5. The graphical display system of claim 3, wherein the at least one processing unit is further adapted to transmit control signals to the display element to dynamically adjust the displayed spatial representations of thrust profile data based on movement of the aircraft.

6. The graphical display system of claim 5, wherein the at least one processing unit is further adapted to transmit control signals to the display element to display a spatial representation of a break-away thrust profile for aircraft beginning to move with speeds below 15 knots, a spatial representation of an idle thrust profile for aircraft with a taxi speed above 15 knots, and a spatial representation of a takeoff thrust profile for aircraft beginning to move on a runway.

7. The graphical display system of claim 1, wherein the at least one processing unit is further adapted to transmit control signals to the display element to display the spatial representation of thrust profile data with warning, caution, and advisory zones.

8. The graphical display system of claim 7, wherein the at least one processing unit is further adapted to transmit control signals to the display element to display a warning zone for exhaust velocities above 100 knots, a caution zone for exhaust velocities between 50 to 100 knots, and an advisory zone for exhaust velocities below 50 knots.

9. The graphical display system of claim 7, wherein the at least one processing unit is further adapted to transmit control signals to the display element to display the spatial representation of thrust profile data with warning, caution, and advisory zones based on temperature boundary points.

10. The graphical display system of claim 1, wherein the at least one sensor further includes a sensor adapted to obtain an engine power parameter; wherein the at least one processing unit is further adapted to transmit control signals to the display element to dynamically adjust the spatial representation of thrust profile data based on the engine power parameter.

11. The graphical display system of claim 10, wherein the at least one sensor is further adapted to obtain at least one of throttle angle, fuel flow, engine pressure ratio, and jet fan speed.

12. A method of displaying thrust profile data, the method comprising:
    receiving location data for aircraft within a set geographical area;
    retrieving thrust profile data from a database for at least one aircraft within the set geographical area; and
    displaying a spatial representation of the thrust profile data on a map in relation to the at least one aircraft's location.

13. The method of claim 12, further comprising:
    obtaining an engine power parameter for the at least one aircraft from at least one sensor; and
    dynamically adjusting the displayed spatial representation of the thrust profile data based on the engine power parameter.

14. The method of claim 12, wherein displaying a spatial representation of the thrust profile data further comprises adjusting the spatial representation based on movement of the at least one aircraft.

15. The method of claim 12, wherein displaying a spatial representation of thrust profile data further comprises displaying a spatial representation of thrust profile data using warning, caution, and advisory zones.

16. A computer program product, comprising:
    a computer-usable medium having computer-readable code embodied therein for configuring a computer processor, the computer-readable code comprising:
    first executable instructions configured to cause a computer processor to retrieve thrust profile data from a database for at least one aircraft; and
    second executable instructions configured to cause a computer processor to transmit control signals, based on the thrust profile data, to a display element to display on a map a spatial representation of the at least one aircraft's thrust profile data.

17. The computer program product of claim 16, wherein the second executable instructions further comprise instructions configured to cause a computer processor to transmit control signals to a display element to display on the map a spatial representation of thrust profile data for each aircraft within a set geographical area.

18. The computer program product of claim 16, wherein the second executable instructions further comprise instructions configured to cause a computer processor to transmit control signals to a display element to dynamically adjust the spatial representation of the at least one aircraft's thrust profile data based on an engine power parameter.

19. The computer program product of claim 16, wherein the second executable instructions further comprise instructions configured to cause a computer processor to transmit control signals to a display element to display the spatial representation of the at least one aircraft's thrust profile data with warning, caution, and advisory zones.

20. The computer program product of claim 16, wherein the second executable instructions further comprise instructions configured to cause a computer processor to calculate the effect of detected wind on aircraft thrust and to transmit control signals to a display element to display on the map the spatial representation of the at least one aircraft's thrust profile data modified with the effects of wind.

\* \* \* \* \*